Figure 1:
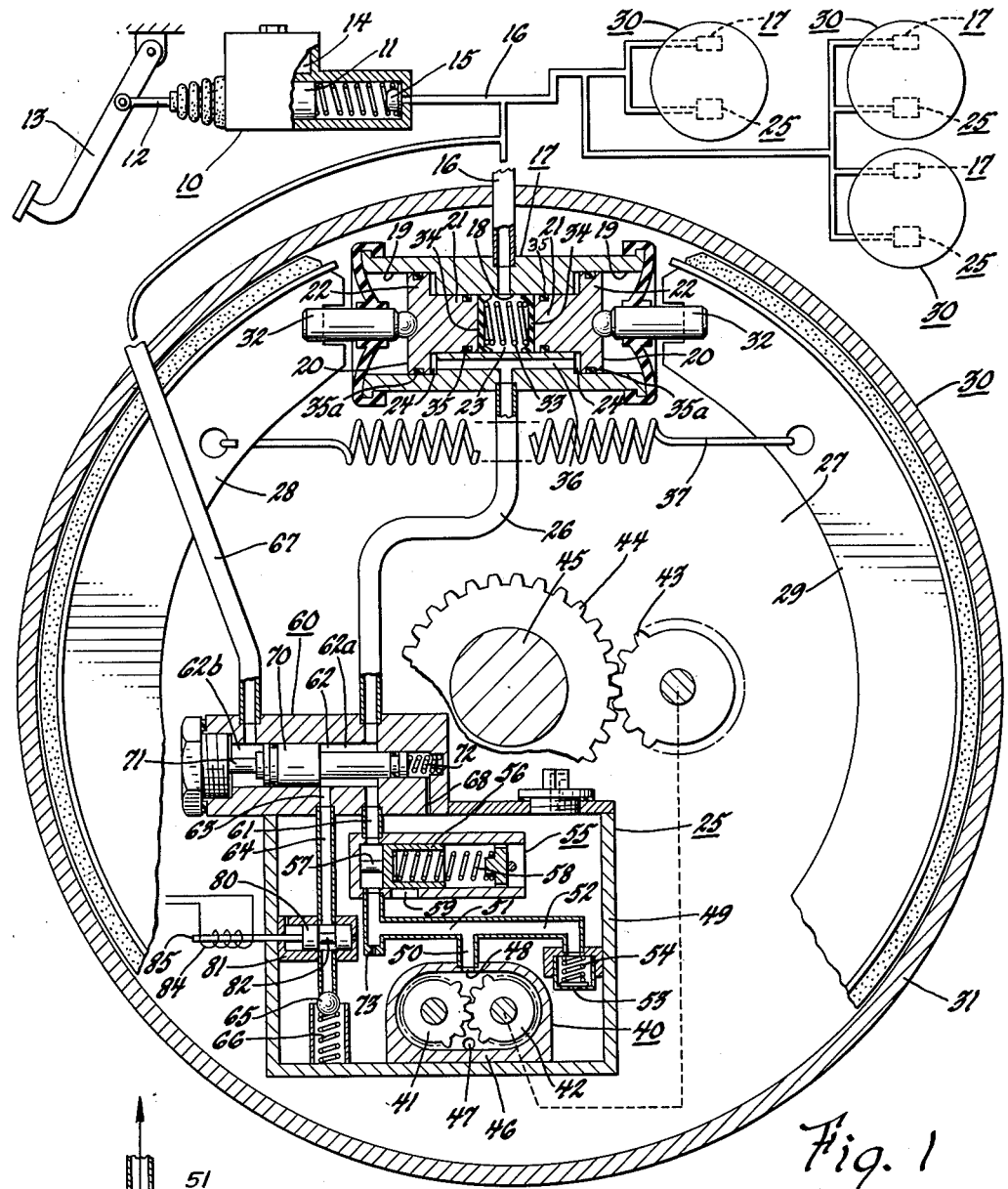

March 10, 1964 N. B. KELL 3,124,220
ANTI-SKID VEHICLE BRAKE SYSTEM
Filed March 23, 1962

INVENTOR.
Nathaniel B. Kell
BY
C. W. C. Staley
HIS ATTORNEY

United States Patent Office 3,124,220
Patented Mar. 10, 1964

3,124,220
ANTI-SKID VEHICLE BRAKE SYSTEM
Nathaniel B. Kell, Indianapolis, Ind., assignor to General Motors Corporation, Detroit, Mich., a corporation of Delaware
Filed Mar. 23, 1962, Ser. No. 182,017
9 Claims. (Cl. 188—181)

This invention relates to vehicle brake actuating systems and particularly to a system to reduce wheel skid.

An object of the invention is to provide a brake control system using a hydraulic brake force wherein the major force for a brake application is obtained hydraulically from a pump driven by rotation of the wheel in a manner that the output of the pump regulates the brake application force in proportion to wheel speed.

In this invention each of the braking wheels of a vehicle is provided with a fluid or hydraulic pump that is driven by the wheel so that pump delivery varies in proportion to wheel speed. Each of the wheels of the vehicle is provided with a differential area piston and cylinder arrangement so that the hydraulic fluid delivered from the pump driven by the wheel is supplied to the larger of the differential areas of the piston cylinder arrangement. Normally, this hydraulic fluid is by-passed to a reservoir by a control valve. This control valve is operated by fluid pressure from the master cylinder of the brake system so as to restrict the return by-pass flow and thereby effect pressure increase in the larger area of the differential cylinder and piston for power actuation of the wheel brake. The fluid pressure from the master cylinder is also delivered to the smaller cylinder piston area concurrently with delivery of the master cylinder fluid pressure to the control valve so that the initial brake actuating movement is accomplished through the use of the fluid pressure force from the master cylinder with the hydraulic fluid from the fluid pump assisting the master cylinder fluid pressure when the control valve operates to cause an increase of the fluid pressure in the larger piston cylinder area of the wheel cylinder.

A further object of the invention is to provide a brake control system in accordance with the foregoing object wherein a fluid vent is provided in the fluid connection between the pump and the larger piston cylinder area of the wheel cylinder so that if the fluid pump should stop, such as during a skid, during a brake application, the pressure in the fluid connection to the larger piston cylinder area will immediately decay and reduce the braking force on the wheel that is skidding.

Further objects and advantages of the present invention will be apparent from the following description, reference being had to the accompanying drawings wherein preferred embodiments of the present invention are clearly shown.

Figure 2:
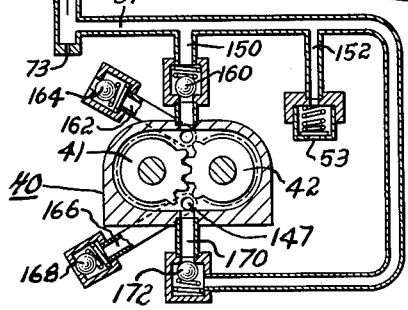

In the drawings:

FIGURE 1 is a schematic illustration of a brake control system incorporating features of this invention, one wheel of a four-wheeled vehicle being shown enlarged to illustrate the features of the invention; and FIGURE 2 is a modification of the arrangement disclosed in FIGURE 1 wherein the fluid pump can supply fluid under pressure to operate the brake on a reverse braking.

In this invention the brake control system includes a master cylinder 10 in which a master cylinder piston 11 reciprocates by action of the rod 12 that connects with the brake pedal 13 on the vehicle. The master cylinder 10 is supplied with hydraulic fluid from a reservoir 14. Fluid under pressure is delivered from the master cylinder 10 through a residual pressure check valve 15 by forward movement of a piston 11 for supply to the hydraulic line 16 that connects with wheel cylinders 17 of the several wheels of the vehicle. The master cylinder and reservoir structure and the residual check valve are of conventional design so that further illustration and description is deemed unnecessary, it being well known that the residual pressure check valve 15 normally retains some pressure in the line 16 at all times when the brakes are in released condition to prevent entry of air into the brake lines.

The wheel cylinder 17 of this invention is provided with a compound bore comprising a smaller diameter cylinder bore 18 and a larger diameter cylinder bore 19. A piston 20 having dual diameters consisting of a small diameter portion 21 and a large diameter portion 22 operates in the cylinder bores 18 and 19, respectively, a piston 20 being provided at each end of the wheel cylinder 17, as shown in FIGURE 1. Piston portion 21 operating in cylinder bore 18 provides a small cylinder piston area that is directly connected with the master cylinder through the supply line 16. The larger diameter portion 22 operating in the larger diameter cylinder bore 19 forms a second and larger piston cylinder area 24 that communicates with a wheel driven fluid pump 25 through a conduit 26 in a manner hereinafter described.

Each of the brake structures 30 for each of the wheels of the vehicle has a wheel cylinder 17 of the type illustrated in FIGURE 1 so that each of the brakes for the respective wheels is operated separately and independently, each being supplied by fluid under pressure from the master cylinder through the conduit connection 16.

The wheel cylinder 17 of each of the brake structures is carried on a conventional backing plate 27 that also supports the brake shoes 28 and 29 adapted to be moved outwardly into engagement with the drum 31 of the brake assembly 30.

The pistons 20 each has a plunger member 32 extending into engagement with the respective brake shoes 28 and 29 to move them into engagement with the brake drum 31 on supply of hydraulic fluid into the smaller diameter chamber 23 of the wheel cylinder. A compression spring 33 is placed between the sealing cups 34 on each of the pistons 20 to prevent loss of hydraulic fluid from chamber 23. An O-ring seal 35 also aids in this purpose and an O-ring seal 35a is provided around the piston portion 22 to prevent loss of fluid pressure from the cylinder chamber 24 that is supplied with fluid from the pump mechanism 25 through the conduit 26 and the passage 36 in the wheel cylinder 17.

Brake shoes 28 and 29 are retained in normal retracted position by a retraction spring 37. The brake shoes 28 and 29 may be connected to a suitable fixed pivot connection at each of their lower ends in conventional and well-known manner.

Each of the pump assemblies 25 for each of the brake assemblies 30 includes a fluid or hydraulic pump 40 that may consist of a pair of counterrotating gears 41 and 42. One of the gears, such as gear 42, is driven by a gear 43 which in turn is driven by gear 44 mounted on the shaft 45 that rotates with the wheel of the vehicle so that the driven speed of the pump 40 is proportional to the speed of rotation of the vehicle wheel on shaft 45. Thus each of the pump assemblies 25 for each of the wheels of the vehicle rotates at a speed that is proportional to the wheel speed that drives the respective pump.

Each of the pumps 40 includes a pump housing 46 having an inlet port 47 and a discharge port 48, the entire pump assembly 40 being placed within a reservoir housing 49 that is substantially filled with hydraulic fluid.

The pump 40 exhausts into a conduit 50 that has a branch 51 and a branch 52, the branch 52 being provided with a check valve 53 that opens in an upward direction against the spring 54 for a purpose hereinafter described.

The pump output branch line 51 connects with a pressure regulating valve 55 that has a piston 56 normally positioned as shown in FIGURE 1 by the stop element 57, a compression spring 58 urging the piston 56 in a left-hand direction. The pressure regulating valve 55 has a by-pass port 59 to allow for relief of high-pressure flow of fluid from the branch line 51 back into the reservoir 49 when pressure goes above a predetermined value as controlled by the spring 58.

The pressure regulating valve 55 connects with a fluid flow control valve 60 by means of a conduit 61 that connects with a cylinder chamber 62 which also connects with the conduit 26 that supplies fluid under pressure to the chamber 24 of the wheel cylinder 17.

The cylinder chamber 62 of the fluid flow control valve 60 also has an outlet port 63 that connects with the conduit 64 at the end of which there is placed the check valve 65 urged against its seat by the spring 66. This check valve 65 retains a residual fluid pressure in the chamber 62 of the fluid control valve 60 as well as in the cylinder chamber 24 of the wheel cylinder 17 so long as the pump 40 is driven by the wheel of the vehicle, to prevent inflow of air into the brake lines of the system.

The fluid flow control valve includes a piston 70 reciprocable in the cylinder chamber 62 and is normally disposed in the position shown in FIGURE 1 against the stop element 71 by means of the spring 72 so that there is a normal, substantially free flow of hydraulic fluid from the pump 40 through the pressure regulating valve 55, chamber 62 and back through the conduit 64 through the check valve 65, the check valve 65 holding a residual pressure of some four or five pounds in the just mentioned circuit to prevent air from entering the system.

The piston 70 divides the cylinder chamber into the chamber portion 62a at the right-hand side of the piston 70 and the chamber portion 62b at the left-hand side of the piston 70. The chamber portion 62b is connected by means of conduit 67 with the master cylinder discharge conduit 16 so that fluid under pressure delivered from the master cylinder 10 through the conduit lines 16 will also be present in the cylinder chamber 62b whenever the master cylinder 10 is actuated by operation of the brake lever 13.

The vent line 68 is provided from the chamber that holds spring 72 to prevent build-up of hydraulic fluid pressure in this chamber.

Also, a hydraulic fluid vent 73 is provided in the conduit 51 for the purpose of providing for a decay of hydraulic fluid pressure in the conduit 26 and the cylinder chamber 24 of the wheel cylinder 17 whenever the pump 40 stops during a brake application, such as during a wheel skid. This will result in a reduction of fluid pressure on the large piston portion 22 of the wheel cylinder, thereby reducing the brake force on the wheel to allow the wheel to again rotate, at which time the fluid pressure from the pump 40 will again be applied to the wheel cylinder for reapplying the brake.

When the wheel brake is in retracted position, the several components of the system illustrated in FIGURE 1 are in the position shown. In operation, when the brake lever 13 is depressed, that is moved to the right, as shown in the drawing, the master cylinder piston 11 is moved forward to effect discharge of hydraulic fluid from the master cylinder 10 into the conduit lines 16 for delivery to the wheel cylinders 17 of the several brakes of the respective wheels. Delivery of fluid under pressure from the master cylinder through the conduit 16 supplies this fluid to the smaller diameter cylinder area 23 of the wheel cylinders 17 to move the pistons 20 outwardly and thereby effect an initial applying of the brake shoes 28 and 29 against the drum 31.

Should the vehicle be in a static condition, that is standing still, the pump 40 will not be rotating so as to supply any fluid under pressure from the pump. Under this condition, the outward movement of the pistons 20 would tend to produce a vacuum in the cylinder chambers 24 of the wheel cylinder so that at this time the check valve 53 can open upwardly to allow hydraulic fluid to be supplied from the reservoir chamber 49 to the conduits 51 and 52 and the conduit 26 into the cylinder chambers 24. Thus there will be no cause for vacuum to be drawn in the chamber 24.

Whenever the vehicle is in motion and the wheels are rotating, the pump 40 of each of the wheels is delivering fluid under pressure into the conduit 50 and into the branch lines 51 and 52. So long as the brake is in the released condition, the hydraulic fluid discharged from the pump 40 will be delivered through the pressure regulating valve 55 in a free manner and into the cylinder chamber 62a of the fluid flow control valve and thence back through the conduit 64 into the reservoir in substantially free flow manner except for the check valve 65 that holds the residual pressure in the cylinder chamber 62a and thereby the line 26 and through it in the chamber 24 of the wheel cylinder 17 in a manner heretofore described.

However, when the fluid pressure from the master cylinder is delivered into the conduit 16 and thereby into conduit 67 for delivery concurrently into the cylinder chamber 62b of the flow control valve 60, piston 70 is moved in a right-hand direction as viewed in FIGURE 1 to gradually close the passage 63 in the fluid flow control valve. Closing of passage 63 reduces the discharge flow of hydraulic fluid through conduit 64 and thereby increases pressure in the cylinder chamber 62a and also in the conduit 26 as well as in the cylinder chamber 24 of wheel cylinder 17. This increase of fluid pressure in wheel cylinder chamber 24 produces a power application of the brakes to assist the manual application that has been previously and concurrently applied by the smaller diameter piston portion 21 of the pistons 20. The pressure in the chamber 62a will increase until it balances against the pressure in chamber 62b as required by the brake effort needed to effect a desired retarding effect on the vehicle. Thus the brake is self-energizing in the sense that the power for the fluid pump and development of fluid pressure for power application is taken from the wheel source itself so that the volume of fluid delivered by the pump 40 being proportional to the speed of rotation of the wheel will develop fluid pressure in the chamber 62a that is also proportional to the speed of rotation of the wheel.

Should the brake effort applied by the master cylinder be such that any one of the wheels of the vehicle stops, because of a skid condition, or because of overbraking at one of the wheels, the pump 40 will also stop rotation so that fluid will no longer be delivered into the conduit 26 and the branch line 51 from the pump 40. Under this condition, the vent port 73 provided in conduit 51, which is continuously open, will immediately cause a decay of pressure in the conduit 26 and in the cylinder chamber 24 of the wheel cylinder 17 of the wheel that is stopped so as to reduce the braking effort applied by the shoes 28 and 29 to the brake drum 31.

Stopping of the brake effort to the drum 31 will release the wheel and allow it to again rotate at which time the pump 40 will again deliver fluid under pressure in a manner heretofore described to reapply the brake. This decay of pressure and reapplying the brake can be occasioned as many times as is necessary to prevent the respective wheels from sliding or skidding. Therefore, the rotation or nonrotation of the wheel is the deciding factor as to whether the brake of the respective wheel is applied or not applied or its rate of application is under control of the volume of fluid delivered from its respective pump 40.

If pump delivery becomes excessive at any time, the pressure regulating valve 55 will open the by-pass passage 59 to prevent the fluid pressure in the line 26 rising beyond a predetermined value as controlled by the spring 58.

An auxiliary control may be provided in the conduit 64 to function as an emergency brake control. For this purpose a slide valve member 80 operating in the housing 81 normally has the reduced diameter portion 82 thereof in alignment with the conduit 64 so that the valve element 80 has no effect on the substantially free flow of hydraulic fluid in the circuit heretofore described. However, when an emergency braking effort is to be applied, an electric control 84 may be energized to move the valve element 80 in a left-hand direction and thereby restrict or cut off fully the passage 64 which produces a sudden increase of fluid pressure in the line 26 and thereby rapidly applies the brake. This control may be either by means of the electric coil as shown in FIGURE 1 or the stem 85 of the valve element 80 could be operated manually from a parking brake lever that is normally provided in the vehicle. Thus the valve 80 can provide for an auxiliary brake control effort in the event the master cylinder 10 should for some reason be rendered ineffective.

The arrangement of the apparatus shown in FIGURE 1 provides for flow of hydraulic fluid from the pump in only one direction, that is out through the discharge port 48. However, by a suitable arrangement of check valves, such as that shown in FIGURE 2, the pump could be made reversible for flow in the opposite direction to supply fluid under pressure into the line 26 during a reverse brake operation.

When the vehicle is traveling in the forward direction the pump gears 41 and 42 deliver fluid under pressure to the conduit 150. A check valve 160 is positioned in conduit 150 to permit flow of pressurized fluid away from the pump 40 while prohibiting reverse flow. Fluid under pressure is also delivered through conduit 162 from the pressure side of the pump to the check valve 164. This valve remains closed since it will not permit flow out of conduit 162. However, the valve is immersed in fluid in the reservoir. The branch conduits 51 and 152 are provided in fluid connection with conduit 150. The vent 73 is provided in branch conduit 51, as shown in FIGURE 1, and conduit 51 supplies fluid under pressure to the remainder of the system in the same manner as in FIGURE 1. The check valve 53 to which branch conduit 152 is connected operates in the same manner as check valve 53 of FIGURE 1. A conduit 166 is connected with the port 147 at one end positioned on one side of pump 40 and the other end of conduit 152 terminates at check valve 168, which is also immersed in fluid in the reservoir. Since port 147 is on the suction side of the pump with the vehicle moving in the forward direction, fluid is supplied to the pump through check valve 168 and conduit 166. A conduit 170 is connected to the same side of the pump 40 as is port 147 and has a check valve 172 therein which is closed when the vehicle is traveling in the forward direction so as to prevent flow through conduit 170 to the pump 40. Conduit 170 is connected beyond check valve 172 with conduit 150 and branch conduits 51 and 152. Thus the fluid pressure in conduit 150 is provided in a portion of conduit 170 between conduit 150 and check valve 172 when the vehicle is traveling in the forward direction.

When the vehicle is traveling in the reverse direction, gears 41 and 42 are rotated so as to cause the suction and pressure sides of the pump 40 to be reversed. Pressurized fluid is then delivered to conduit 166 and check valve 168 closes. Pressurized fluid is also delivered through conduit 170 to open check valve 172 and continue into branch conduit 51. The pressure also closes check valve 160, and conduit 162 and check valve 164 operate as the pump intake. Thus the pump is reversible for flow in the opposite direction to supply fluid under pressure to the line 26 during reverse operation.

While the embodiments of the present invention as herein disclosed constitute preferred forms, it is to be understood that other forms might be adopted.

What is claimed is as follows:

1. A brake control system, including in combination, a rotatable wheel including a brake, a fluid pump driven by said wheel and having a fluid reservoir, a fluid motor for operating the brake on the wheel, said fluid motor having differential piston areas, a master cylinder having fluid connection with the smaller of said differential piston areas, said pump having fluid connection with the larger of said differential piston areas, and valve means in said last-mentioned fluid connection controlling fluid pressure applied by said pump on said larger of said differential piston areas, said valve means having fluid connection with said master cylinder to operate said valve means to effect increase of fluid pressure in said last-mentioned fluid connection in proportion to increase of fluid pressure in said first-mentioned fluid connection.

2. A brake control system, including in combination, a rotatable wheel including a brake, a fluid pump driven by said wheel and having a fluid reservoir, a fluid motor for operating the brake on the wheel, said fluid motor having differential piston areas, a master cylinder having fluid connection with the smaller of said differential piston areas, said pump having fluid connection with the larger of said differential piston areas, and valve means in said last-mentioned fluid connection controlling fluid pressure applied by said pump on said larger of said differential piston areas, said valve means including fluid passage means providing for substantially free flow of fluid from said pump and a valve member movable to increasingly restrict fluid flow through the said fluid passage means to increase thereby fluid pressure in the said last-mentioned fluid connection, said valve member having fluid connection with said first-mentioned fluid connection to move the valve member and increasingly restrict fluid flow through the said fluid passage means in proportion to increase of fluid pressure in said first-mentioned fluid connection.

3. A brake control system, including in combination, a rotatable wheel including a brake, a fluid pump driven by said wheel proportional thereto, a fluid reservoir connected with said pump, a fluid motor connected to said brake and operating the same, said motor comprising a cylinder and a piston reciprocable therein, said piston having differential areas cooperating with said cylinder providing a small piston cylinder area and a large piston cylinder area separated one from the other, a master cylinder having fluid connection with the smaller piston cylinder area, said pump having fluid connection with the larger piston cylinder area, and valve means in said second-mentioned fluid connection controlling fluid pressure applied to said larger piston cylinder area, said valve means having fluid connection with said master cylinder to operate said valve means thereby to effect increase of fluid pressure applied to said larger piston cylinder area in proportion to increase of pressure in said master cylinder and said smaller piston cylinder area.

4. A brake control system, including in combination, a rotatable wheel including a brake, a fluid pump driven by said wheel proportional there to, a fluid reservoir connected with said pump, a fluid motor connected to said brake and operating the same, said motor comprising a cylinder and a piston reciprocable therein, said piston having differential areas cooperating with said cylinder providing a small piston cylinder area and a larger piston cylinder area separated one from the other, a master cylinder having fluid connection with the smaller piston cylinder area, said pump having fluid connection with the larger piston cylinder area, valve means fluid connected with said master cylinder to be operated thereby and positioned in said second-mentioned fluid connection controlling fluid pressure applied to said larger piston cylinder area, and a fluid vent in said second-mentioned fluid connection providing for decay of fluid pressure therein whenever said pump ceases to deliver fluid thereto.

5. A brake control system, including in combination, a rotatable wheel including a brake, a fluid pump driven by said wheel proportional there to, a fluid reservoir connected with said pump, a fluid motor connected to said brake and operating the same, said motor comprising a cylinder and a piston reciprocable therein, said piston having differential areas cooperating with said cylinder providing a small piston cylinder area and a large piston cylinder area separated one from the other, a master cylinder having fluid connection with the smaller piston cylinder area, said pump having fluid connection with the larger piston cylinder area, and a fluid vent in said second-mentioned fluid connection providing for decay of fluid pressure in said larger piston cylinder area whenever said pump ceases to deliver fluid thereto.

6. A brake control system constructed and arranged in accordance with claim 3 that includes check valve means in said second-mentioned fluid connection providing for flow of fluid from said reservoir to said larger piston cylinder area on operation of said piston in said cylinder by said master cylinder when said pump is stopped.

7. A brake control system, including in combination, a rotatable wheel including a brake, a fluid pump driven by said wheel proportional thereto, a fluid reservoir connected with said pump, a fluid motor connected to said brake and operating the same, said motor comprising a cylinder and a piston reciprocable therein, said piston having differential areas cooperating with said cylinder providing a small piston cylinder area and a large piston cylinder area separated one from the other, a master cylinder having fluid connection with the smaller piston cylinder area, said pump having fluid connection with the larger piston cylinder area, valve means fluid connected with said master cylinder to be operated thereby and positioned in said second-mentioned fluid connection controlling fluid pressure applied to said larger piston cylinder area, said valve means having one position normally providing for free flow of fluid from said pump to said reservoir and movable through a stroke length by increasing pressure in said master cylinder to increasingly restrict said fluid flow to said reservoir from said pump and increase thereby pressure of fluid in said larger piston cylinder area to actuate said brakes with increasing force.

8. A brake control system constructed and arranged in accordance with structure set forth in claim 7 that includes a fluid vent in said second-mentioned fluid connection providing for decay of fluid pressure in said larger piston cylinder area whenever said pump ceases to deliver fluid thereto during actuation of the brake.

9. A brake control system constructed and arranged in accordance with claim 7 which includes additional valve means in the fluid flow connection between said first-mentioned valve means and said reservoir and separately operated to restrict the said fluid flow to the said reservoir independently of the operation of said first-mentioned valve means.

References Cited in the file of this patent

UNITED STATES PATENTS

| | | |
|---|---|---|
| 2,907,607 | Williams | Oct. 6, 1959 |
| 2,919,162 | Roberts | Dec. 29, 1959 |
| 2,920,924 | Reswick | Jan. 12, 1960 |